United States Patent
Matsuyoshi et al.

(10) Patent No.: US 7,666,925 B2
(45) Date of Patent: Feb. 23, 2010

(54) INK COMPOSITION FOR WATERLESS LITHOGRAPHIC PRINTING OF SEAMLESS CAN FOR RETORT FOOD

(75) Inventors: Takao Matsuyoshi, Kyoto (JP); Shinichiro Baba, Kyoto (JP); Kayo Yokoyama, Kyoto (JP)

(73) Assignee: Matsui Chemical Co., Ltd., Kyoto (JP)

( * ) Notice: Subject to any disclaimer, the term of this patent is extended or adjusted under 35 U.S.C. 154(b) by 341 days.

(21) Appl. No.: 11/401,234

(22) Filed: Apr. 11, 2006

(65) Prior Publication Data

US 2007/0238809 A1 Oct. 11, 2007

(51) Int. Cl.
*C09D 11/00* (2006.01)

(52) U.S. Cl. .................. 523/160; 523/161; 106/31.13; 430/49.2; 525/419

(58) Field of Classification Search .................. 253/160
See application file for complete search history.

(56) References Cited

U.S. PATENT DOCUMENTS

| | | | | | |
|---|---|---|---|---|---|
| 3,979,343 | A | * | 9/1976 | Graham et al. | 523/200 |
| 4,253,397 | A | * | 3/1981 | Emmons et al. | 101/450.1 |
| 5,965,633 | A | * | 10/1999 | Revol | 523/160 |
| 6,550,389 | B1 | * | 4/2003 | Goto et al. | 101/483 |
| 6,632,859 | B1 | * | 10/2003 | Jones et al. | 523/160 |
| 6,646,025 | B1 | * | 11/2003 | Kingman et al. | 523/160 |
| 6,806,301 | B2 | * | 10/2004 | Latunski et al. | 523/160 |
| 2002/0185035 | A1 | * | 12/2002 | Kitagawa et al. | 106/31.32 |
| 2004/0082684 | A1 | * | 4/2004 | Nagayama et al. | 523/160 |

FOREIGN PATENT DOCUMENTS

JP 2005-314494 11/2005

OTHER PUBLICATIONS

K. A. Earhart, The Journal of the American Oil, Chemists' Society, vol. 31, Nov. 1954, pp. 597-600.*
Mehta, D. P., Journal of Industrial Technology, 20 (4), 2004, available online at http://www.nait.org/jit/Articles/menta110804.pdf.*

* cited by examiner

*Primary Examiner*—David Wu
*Assistant Examiner*—Vu Nguyen
(74) *Attorney, Agent, or Firm*—Antonelli, Terry, Stout & Kraus, LLP.

(57) ABSTRACT

There is provided an ink composition for waterless lithographic printing of a seamless can for retort food which is excellent in retort resistance and does not have an adverse effect on environment, and a printing method using the same ink composition. This ink composition comprises (A) an alkyd resin containing 40 to 60% by mass of at least one kind of fatty acids and (B) an organic solvent which contains an aliphatic hydrocarbon solvent as main component and does not contain an aromatic hydrocarbon solvent substantially, wherein the number average number of carbon atoms of fatty acids in the alkyd resin (A) is from 10 to 14 and a solid content of the alkyd resin is from 30 to 70% by mass.

16 Claims, No Drawings

INK COMPOSITION FOR WATERLESS LITHOGRAPHIC PRINTING OF SEAMLESS CAN FOR RETORT FOOD

BACKGROUND OF THE INVENTION

The present invention relates to an ink composition for waterless lithographic printing of a seamless can for retort food which is excellent in retort resistance and does not have an adverse effect on environment, and a printing method using the same ink composition.

On an outer surface of a seamless can, indication of its contents and necessary instructions are printed. For such printing, letterpress dry offset printing and lithographic printing methods are adopted. The offset printing method is a method of once transferring an image from a printing plate to a blanket and then printing on an article to be printed, and also the lithographic printing method employs an offset and therefore is classified into the offset printing method. In the letterpress dry offset printing method, defacing of printed letters and dotted image easily arises, but since an inker unit thereof is compact and high speed printing can be carried out, this printing method is mainly used currently.

Generally lithographic printing usually uses damping water, but there is a case where bleeding of an image occurs due to mixing of water in the ink. Further there are disadvantages that a large-sized inker unit is required and it is difficult to increase a printing speed. Therefore the lithographic printing method has hardly been adopted in the filed of printing of a seamless can.

Recently in order to compensate for those disadvantages, there is proposed a method of carrying out waterless lithographic printing by mounting a waterless lithographic plate on a conventional letterpress dry offset printer as disclosed in JP2001-129966A, and this method is put into practical use for printing of a seamless can in which retort treatment is not necessary.

In the waterless lithographic printing method, a non-printing portion is made of a silicone rubber having a property of repelling an ink, and the method comprises transferring the ink only to a printing portion made of aluminum, once transferring an image of the printing portion to a blanket and then pressing the blanket onto an outer surface of the seamless can to transfer the ink.

Also an ink to be used for such a waterless lithographic printing method is demanded to have specific properties. Usual inks for lithographic printing and letterpress printing cannot be used as they are for the waterless lithographic printing.

Important properties required for an ink for waterless lithographic printing are resistance to stain of non-printing portion and transferability. When a temperature of a printing plate is increased during printing, an ink is lowered in its aggregation to adhere to a non-printing portion. This phenomenon is so-called as stain of non-printing portion. The resistance to stain of non-printing portion is a property to prevent the phenomenon.

In order to prevent this stain of non-printing portion, a method of increasing an aggregation force of a binder resin of the ink (increase in a molecular weight and concentration of a resin, etc.) and a method of decreasing an adhering force of the ink on a non-printing portion (addition of silicone oil, etc.) are studied.

However in the case of increasing a molecular weight of a resin, selection of a solvent is difficult, and though the increase in a molecular weight of a resin has an effect on reduction of ink adhesion on a non-printing portion, transferability of ink to a printing portion is lowered.

For waterless lithographic printing, a rosin-modified phenol resin is most generally used as an ink binder resin, and when a molecular weight of this resin is made high, an aromatic hydrocarbon solvent becomes essential as a solvent.

On the other hand, it is desired not to use an aromatic hydrocarbon solvent in consideration of an effect on environment. Also for an ink for lithographic printing, solvent systems using no aromatic hydrocarbon solvent are proposed.

For example, in JP5-247394A, there is proposed a solvent mixture comprising an alkyl-substituted aromatic hydrocarbon solvent and a solvent comprising naphthene and paraffin as main components. In JP-5-247395, a petroleum solvent containing a n-paraffin component in an amount of not less than 90% by weight is proposed.

JP10-292145A proposes that a liquid polyorganosiloxane is mixed for enhancement of transferability and also a content of an aromatic hydrocarbon solvent is adjusted to be not more than 1% by weight.

Also in JP2003-12988A, there is proposed a solvent which contains diaryl alkane having 15 to 18 carbon atoms in an amount of not less than 10% by weight and has an aniline point of not more than 90° C. and an initial boiling point of not less than 290° C. This patent publication says that an aromatic hydrocarbon solvent, aliphatic hydrocarbon solvent and general solvents such as alcohol solvent and ether solvent can be used as other solvent.

However in JP5-247394A and JP2003-12988A, a solvent is an alkyl-modified aromatic hydrocarbon or aryl-modified alkane, and both of them are solvents comprising aromatic hydrocarbon as a basic component, and an effect on environment cannot be estimated.

JP5-247395A discloses an effect of using n-paraffin, but use of an aromatic hydrocarbon solvent is allowed and an effect on environment cannot be estimated.

JP10-292145A says that transferability cannot be enhanced unless a liquid polyorganosiloxane is mixed, but it is known that the polyorganosiloxane repels a varnish to be coated on an ink and has an adverse effect on a surface condition.

Moreover any of those patent publications, JP5-247394A, JP-5-247395, JP10-292145A and JP2003-12988A are improvements when using a rosin-modified phenol resin as a binder resin, and there is no teaching as to development to other resins.

Also though a method of waterless lithographic printing of a seamless can which uses an alkyd resin as a binder resin is disclosed in JP2002-103775A, there is no disclosure with respect to a solvent.

On the other hand, many seamless cans are used as a vessel for retort foods. For vessels for retort foods, resistance to heating in a boiling water, heating in a microwave oven, etc. is demanded from the viewpoint of applications thereof. Similarly retort resistance is demanded for printing of an outer surface of such cans.

In order to impart retort resistance to an ink for waterless lithographic printing, generally a mechanical strength of a binder resin is increased by crosslinking. For example, curing agents comprising an amine resin such as a methylolmelamine resin are used as a curing agent. However since an amine resin curing agent itself has weak repellency to a silicone rubber of a non-printing portion, there is a case where not only staining of a non-printing portion but also generation of formaldehyde which is said to have an effect on environment occurs. Therefore it is desired not to use such a curing agent.

SUMMARY OF THE INVENTION

An object of the present invention is to provide an ink composition for waterless lithographic printing which is prepared using a solvent system containing no aromatic hydrocarbon solvent substantially, is excellent in retort resistance and makes it possible to obtain a good balance of resistance to stain of non-printing portion and transferability (ink transferability).

The present inventors have made intensive studies with respect to a binder resin on condition that a solvent system containing no aromatic hydrocarbon solvent substantially is used in consideration of an effect on environment, and have found that when containing a specific fatty acid, an alkyd resin shows relatively good solubility in an aliphatic hydrocarbon solvent which is said to be a poor solvent to an alkyd resin. Further the present inventors have studied solvent systems most suitable for such a specific alkyd resin and have completed the present invention.

Namely, the present invention relates to an ink composition for waterless lithographic printing of a seamless can for retort food which contains:

(A) an alkyd resin containing 40 to 60% by mass of at least one kind of fatty acids and (B) an organic solvent which contains an aliphatic hydrocarbon solvent as main component and does not contain an aromatic hydrocarbon solvent substantially, wherein the number average number of carbon atoms of the fatty acid in said alkyd resin (A) is from 10 to 14 and a solid content of the alkyd resin is from 30 to 70% by mass.

In the organic solvent (B), an aliphatic hydrocarbon solvent containing 70 to 100% by mass of α-olefin having 14 to 18 carbon atoms is particularly preferred as the aliphatic hydrocarbon solvent, and an alkyd resin having an acid value of not more than 30 mgKOH and a hydroxyl value of from 120 to 200 mgKOH is preferred as the alkyd resin (A).

Though a curing agent may be blended to the ink composition of the present invention, the ink composition is excellent in retort resistance even if a curing agent is not blended thereto, and therefore use of an amine resin curing agent can be excluded. Accordingly since neither of an amine resin curing agent nor an aromatic hydrocarbon solvent is used, the present invention can provide an ink composition which does not have an adverse effect on environment.

The present invention also relates to a printing method of a seamless can for retort food which comprises carrying out waterless lithographic printing of the ink composition of the present invention on an outer surface of the seamless can for retort food, applying a finishing varnish and baking for curing.

DETAILED DESCRIPTION

The ink composition of the present invention for lithographic printing contains a specific alkyd resin as a binder resin and a specific organic solvent as essential component.

An alkyd resin usually contains a polybasic acid, polyhydric alcohol and fatty acid, and the alkyd resin (A) used in the present invention contains a fatty acid having the number average number of carbon atoms of from 10 to 14 in an amount of from 40 to 60% by mass (based on the alkyd resin) in the alkyd resin.

In the fatty acid used in the present invention, in the case of using two or more kinds of fatty acids, "the number average number of carbon atoms" is a value calculated by multiplying the number of fatty acids (the number of molecules) by the number of carbon atoms of each fatty acid to obtain a product, then dividing the product by the total number of fatty acids (total number of molecules). Therefore a fatty acid having the number of carbon atoms beyond the range of 10 to 14 may be present in the resin. In the case of one kind of fatty acid is used, such a fatty acid has the number of carbon atoms of from 10 to 14. The number average number of carbon atoms can be calculated from a value obtained by measuring with chromatography or gas chromatography.

Examples of an individual fatty acid contained in the fatty acid having the number average number of carbon atoms of from 10 to 14 are decanoic acid (C10), lauric acid (C12), myristic acid (C14), octanoic acid (C8), palmitic acid (C16), stearic acid (C18), oleic acid (C18), ricinoleic acid (C18), linolenic acid (C18), eleostearic acid (C18) and the like. Those fatty acids may be used in a mixture of two or more thereof. Also there are natural mixtures of those fatty acids such as castor oil, coconut oil, linseed oil, safflower oil, dehydrated castor oil and tall oil fatty acid. Among them, those having the number average number of carbon atoms of from 10 to 14 can be used.

If the number average number of carbon atoms is less than 10, transferability of the ink composition is lowered, and if it exceeds 14, since mechanical properties such as a strength of the ink film after the retort treatment are lowered, it becomes necessary to blend a curing agent, particularly an amino resin curing agent, and staining of non-printing portion occurs easily.

In the present invention, known polybasic acids and polyhydric alcohols can be used as other components of the alkyd resin.

Examples of the polybasic acid which can be used are, for instance, dibasic acids such as phthalic anhydride, isophthalic acid, terephthalic acid, succinic anhydride, adipic acid, tetrahydrophthalic anhydride, hexahydrophthalic anhydride and maleic anhydride; tribasic acids such as trimellitic acid anhydride and methylcyclohexenetricarboxylic acid anhydride; and the like.

Examples of the polyhydric alcohol which can be used are, for instance, divalent alcohols such as ethylene glycol, diethylene glycol, triethylene glycol, 1,6-hexanediol and hydrogenated bisphenol A; trivalent alcohols such as glycerin, trimethylolethane and trimethylolpropane; more than tetravalent alcohols such as pentaerythritol and dipentaerythritol; and the like.

The specific alkyd resin to be used in the present invention is prepared by blending the above-mentioned polybasic acid, polyhydric alcohol and specific fatty acid so that a hydroxyl equivalent of the polyhydric alcohol is more than an equivalent of the acid components (polybasic acid and fatty acid) and then carrying out esterification reaction. Usually a hydroxyl equivalent/acid equivalent is adjusted within a range of from 1.2 to 2.0.

In that case, the fatty acid having the number average number of carbon atoms of from 10 to 14 is present in an amount of from 40 to 60% by mass. If the content of fatty acid is less than 40% by mass, transferability of the obtained ink composition is lowered. If the content is higher than 60% by mass, mechanical properties of the ink film such as a tensile strength are lowered, and therefore it becomes necessary to blend a curing agent, particularly an amino resin curing agent, and staining of non-printing portion occurs easily. A preferred lower limit of the content is 45% by mass, and a preferred upper limit of the content is 55% by mass.

Also it is preferable that the acid value of this specific alkyd resin is not more than 30 mgKOH, further preferably not more than 20 mgKOH, particularly preferably not more than 10 mgKOH. When the acid value is not more than 30 mgKOH, transferability of the ink and resistance to stain of non-printing portion are excellent.

Also it is preferable that the hydroxyl value of this specific alkyd resin is from 120 to 200 mgKOH, because transferability of the ink and resistance to stain of non-printing portion are excellent. A preferred lower limit of the hydroxyl value is 140 mgKOH, and a preferred upper limit thereof is 180 mgKOH.

In the present invention, a binder resin may be prepared by using this alkyd resin alone or together with an other known binder resin. Examples of such an other binder resin used together are, for instance, an epoxy ester resin, acryl-modified alkyd resin, styrene-modified alkyd resin, rosin ester resin, fatty acid-modified phenol resin, maleic acid resin and the like. An amount of the other binder resin is preferably not more than 20 parts by mass, further preferably not more than 10 parts by mass, particularly preferably not more than 5 parts by mass based on 100 parts by mass of the alkyd resin.

Another feature of the present invention is to use, as an organic solvent, a solvent mixture which contains an aliphatic hydrocarbon solvent as main component and does not contain an aromatic hydrocarbon solvent substantially.

So far in the case of an ink for waterless lithographic printing comprising a rosin-modified phenol resin, an effort was made so as to decrease an amount of an aromatic hydrocarbon solvent to not more than 1% by mass (for example, JP10-292145A). However in the case of an alkyd resin, it is assumed that an aromatic hydrocarbon solvent is a good solvent and an aliphatic hydrocarbon solvent and alcohol are bad solvents. Therefore it has been considered that nonuse of an aromatic hydrocarbon solvent was difficult.

In the present invention, since the above-mentioned specific alkyd resin is used, the ink composition having stable components and properties can be obtained even without using an aromatic hydrocarbon solvent.

In the present invention, "does not contain an aromatic hydrocarbon solvent substantially" means that positive blending of an aromatic hydrocarbon solvent is excluded but contamination or admixing of an aromatic hydrocarbon solvent contained inevitably in the alkyd resin and additives is not excluded. Concretely an acceptable contamination or admixing amount of an aromatic hydrocarbon solvent is less than 1% by mass, further not more than 0.1% by mass.

Also "containing an aliphatic hydrocarbon solvent as main component" means that the aliphatic hydrocarbon solvent is present as a solvent having a role of dissolving the alkyd resin in the organic solvent. Concretely it is preferable that the organic solvent consists of an aliphatic hydrocarbon solvent or comprises an aliphatic hydrocarbon solvent in an amount of not less than 75% by mass, more preferably not less than 90% by mass. Examples of the organic solvents other than the aliphatic hydrocarbon solvent are aliphatic alcohols, glycols, glycol ethers, ketones, esters and the like, and those solvents can be used optionally.

Examples of the aliphatic hydrocarbon solvent to be used in the present invention are petroleum solvents such as α-olefins, paraffins, isoparaffins and naphthenes. Among them, α-olefins, particularly α-olefins having 14 to 18 carbon atoms (for example, 1-tetracene, 1-heptadecene, 1-octadecene and the like) are preferred since solubility of the above-mentioned specific alkyd resin is good.

It is preferable that α-olefin having 14 to 18 carbon atoms is contained in the organic solvent in an amount of at least 70% by mass, further preferably 80% by mass. The organic solvent may consist of α-olefins having 14 to 18 carbon atoms. Examples of other solvent component are aliphatic hydrocarbon solvents other than α-olefins and the above-mentioned organic solvents other than the aliphatic hydrocarbon solvent.

The organic solvent (B) is contained in an amount being capable of dissolving the alkyd resin (A) and adjusting a viscosity of the ink to be a proper value. The amount of the organic solvent is optionally selected depending on kind and amount of the alkyd resin and kind and combination of the organic solvents so that the solid content of the alkyd resin in the ink composition is within a range of from 30 to 70% by mass.

To the ink composition can be blended additives which are usually blended to ink compositions. Examples thereof are, for instance, a pigment, pigment dispersant, dryer, acid catalyst, wax, viscosity control agent, storage stabilizer and the like.

With respect to a pigment, known pigments can be used unlimitedly if they have heat resistance, light resistance and retort resistance. Examples thereof are, for instance, inorganic pigments such as titanium oxide, silica and carbon black; organic pigments such as Phthalocyanine Blue, Watchung Red, quinacridone, phthalimide, quinophthalone and the like.

An amount of a pigment varies depending on its kind and purpose and may be selected within a range of from 10 to 50% by mass.

The ink composition of the present invention has high practicability even without blending a curing agent, but a curing agent may be blended as case demands. However usual amine resin curing agents which generate formaldehyde are not used to avoid generation of formaldehyde.

The ink composition of the present invention can be prepared by usual method by mixing with a three-roll mill, ball mill, beads mill or the like.

Since the ink composition is used for lithographic printing, it is preferable to adjust a viscosity thereof to be higher than that of general inks. A plastic viscosity of the ink composition is usually within a range of from 20 to 60 Pa•s.

The thus prepared ink composition is subjected to waterless lithographic printing on an outer surface of a seamless can for retort food, and conventional waterless lithographic printing method can be adopted unlimitedly.

Most of materials for a seamless can are metallic materials, for example, aluminum, steel and the like.

Usually a finishing varnish is then coated without baking of the printed ink layer and finally baking for curing is carried out to complete the printing of a seamless can for retort food. The baking is not limited, and is carried out by heating at 160° to 260° C. for 20 seconds to 10 minutes.

The finishing varnish is not limited particularly, and known varnishes having retort resistance can be used. Examples thereof are thermo-setting acryl resins, acryl epoxy resins, acryl amino resins and the like which are of self-emulsification type or surfactant-emulsification type.

The seamless can printed by using the ink composition of the present invention has good adhesion of the ink even under the retort treatment conditions, and has a necessary surface hardness.

The present invention is then explained by means of examples, but is not limited to the examples. "Part" used in examples represents part by mass.

EXAMPLE 1

(1) Preparation of Alkyd Resin

Polybasic acid, polyhydric alcohol and fatty acid shown in Table 1 were blended and then esterification reaction was carried out by usual method until the acid value became 3 mgKOH, to produce liquid alkyd resins (A-1 to A-4 and B-1).

Each component shown in Table 1 is as follows.

Polybasic Acid:
  Phthalic anhydride

Polyhydric Alcohol:
  Trimethylolpropane
  Pentaerythritol

Fatty Acid:
  Castor oil (number average number of carbon atoms: 13.3)
  Decanoic acid (number average number of carbon atoms: 10)
  Linseed oil (number average number of carbon atoms: 17.9)

TABLE 1

| | Number of alkyd resin | | | | |
|---|---|---|---|---|---|
| | A-1 | A-2 | A-3 | A-4 | B-1 |
| Components of alkyd resin (part by mass) Polybasic acid | | | | | |
| Phthalic anhydride | 174.0 | 156.0 | 120.0 | 162.0 | 168.0 |
| Polyhydric alcohol | | | | | |
| Trimethylolpropane | 226.7 | 42.0 | — | — | — |
| Pentaerythritol | — | 145.5 | 164.2 | 188.5 | 171.1 |
| Fatty acid | | | | | |
| Castor oil fatty acid | 240.0 | 300.0 | 360.0 | | |
| Decanoic acid | | | | 300.0 | |
| Linseed oil | | | | | 300.0 |
| Dehydration amount | −40.7 | −43.5 | −44.2 | −50.5 | −39.1 |
| Total | 600 | 600 | 600 | 600 | 600 |
| Ratio of excessive alcohol | 1.46 | 1.49 | 1.46 | 1.41 | 1.51 |
| Acid value (mgKOH) | 3 | 3 | 3 | 3 | 3 |
| Hydroxyl value (mgKOH) | 153 | 164 | 146 | 154 | 161 |

(2) Preparation of Ink Composition

Ink compositions were prepared by blending the liquid alkyd resins (A-1 to A-4, B-1) prepared in (1) above and the binder resin (B-2) containing a curing agent as a binder resin, 30 parts of Phthalocyanine Blue as a pigment and organic solvents shown in Table 2 in amounts shown in Table 2 and kneading and dispersing the mixture with three-roll mill.

Each component shown in Table 2 is as follows.

B-2 (binder resin containing a curing agent):
  Resin prepared by blending 10 parts of alkylated melamine resin (Cymel 238 available from Mitsui Cytec Co., Ltd.) as a curing agent to 35 parts of the binder resin B-1

Pigment:
  Phthalocyanine Blue

Solvent B1:
  Organic solvent mixture (AF5 available from Nippon Oil Corporation) containing 23% by mass of paraffin and 77% by mass of naphthene as aliphatic hydrocarbon solvents and inevitably containing up to 0.2% by mass of aromatic hydrocarbon solvent Solvent B2:
  Organic solvent mixture (DIALEN 168 available from Mitsubishi Chemical Corporation) which contains 55% by mass of 1-hexadecene and 45% by mass of 1-octadecene as aliphatic hydrocarbon solvents and does not contain an aromatic hydrocarbon solvent (not detectable).

Solvent B3
  Organic solvent mixture (ALKEN L available from Nippon Oil Corporation) comprising alkylbenzene having 10 to 14 carbon atoms

(3) Printability Tests

The following tests were carried out with respect to the obtained ink compositions. The results are shown in Table 2.

(Transferability Test)

The ink composition was transferred uniformly onto a test rubber roll by using a printability tester "RI TESTER" (available from Ishikawajima Sangyo Kikai Kabushiki Kaisha) so that a thickness of the dried ink film would be 2.5 μm and then transferred to an aluminum 2-piece can (seamless can, thickness: 50 to 100 μm, 51 mm diameter) at a printing speed of 40 m/min.

Immediately after the transferring, an aqueous overprint varnish comprising 55 parts of water soluble acrylic resin (ALMATEX WA41 available from Mitsui Toatsu Kagaku Kabushiki Kaisha), 15 parts of methylated melamine resin (Cymel 303 available from Cytec Industries Inc.) as a curing agent, 20 parts of de-ionized water and 10 parts of ethylene glycol monoisopropyl ether was coated all over the printed surface (coating amount: 50 mg/100 cm$^2$), and baking was carried out at 220° C. for two minutes to produce a seamless can subjected to lithographic printing.

With respect to this printed seamless can, printed condition (condition of ink transfer) was evaluated with naked eyes by the following criteria.

A: Transferring of an ink and surface smoothness of an ink film are good.

B: Transferring of an ink and surface smoothness of an ink film are slightly inferior as compared with A above, but a can is usable as a product.

C: Transferring of an ink and surface smoothness of an ink film are not good and a can cannot be used as a product.

(Test for Resistance to Stain of Non-Printing Portion)

The ink composition was transferred uniformly onto a test rubber roll by using the above-mentioned printability tester "RI TESTER" so that a thickness of the dried ink film would be 8.0 μm and then the roll was brought into contact with a plate for lithographic printing (available from Toray Co., Ltd.) at a printing speed of 40 m/min by ten turns of roll continuously.

Resistance to stain of non-printing portion (a state of ink transfer on a non-printing portion) was evaluated with naked eyes by the following criteria.

A: Resistance to stain of non-printing portion is good, and no ink transfer on a non-printing portion is found.

B: There is slightly found ink transfer on a non-printing portion, but the printed can is usable as a product.

C: There is found significant ink transfer on a non-printing portion, and the printed can is not usable as a product.

(4) Test for Resistance to Retort Treatment

Printing was carried out in the same manner as in (3) above except that the thickness of dried ink film was 2.0 µm, and each of the overprinted seamless cans was subjected to retort treatment. Before and after the treatment, the following properties were evaluated. The results are shown in Table 2.

(Retort Treatment)

Into a retort treatment vessel is poured 5 liters of deionized water, and a printed test piece is set so that steam is impinged on the test piece. Water is heated to 130° C., and after maintaining at that temperature for 30 minutes, retort is allowed to stand until the water temperature is decreased to room temperature.

(Adhesive Property)

Evaluation is carried out by a cross-cut test prescribed in JIS K5600-5-6.

(Surface Hardness)

Evaluation is carried out by means of JIS-A hardness (pencil hardness) prescribed in JIS K5600-5-4.

The ink composition of the present invention does not have an adverse effect on a printing environment and environment where the printed seamless can is used.

Also since the ink composition is excellent in performance as an ink for lithographic printing such as resistance to stain of ink on a non-printing portion and ink transferability, a good printed image having clear printed letters and dots can be obtained.

Further the ink composition has resistance to retort treatment, and therefore is free from peeling and discoloration even if used as a vessel for retort foods.

What is claimed is:

1. An ink composition for waterless lithographic printing of a seamless can for retort food which comprises:
   (A) an alkyd resin containing 40 to 60% by mass of at least one kind of fatty acids and
   (B) an organic solvent which contains an aliphatic hydrocarbon solvent as main component and does not contain an aromatic hydrocarbon solvent substantially,
   wherein the number average number of carbon atoms of the fatty acid in said alkyd resin (A) is from 10 to 14 and a solid content of the alkyd resin is from 30 to 70% by mass.

2. The ink composition of claim 1, wherein said aliphatic hydrocarbon solvent contains 70 to 100% by mass of α-olefin having 14 to 18 carbon atoms.

TABLE 2

| | \multicolumn{10}{c}{Number of ink composition} |
|---|---|---|---|---|---|---|---|---|---|---|
| | 1 | 2 | 3 | 4 | 5 | 6 | 7 | 8 | 9 | 10 |
| Ink composition (part by mass) | | | | | | | | | | |
| Number of binder resin | | | | | | | | | | |
| A-1 | 40 | | | | 40 | | | | | |
| A-2 | | 40 | | | | 40 | | | | |
| A-3 | | | 40 | | | | 40 | | | |
| A-4 | | | | 40 | | | | | | |
| B-1 | | | | | | | | 40 | 40 | |
| B-2 (containing a curing agent) | | | | | | | | | | B-1(35) + Curing agent(10) |
| Pigment | 30 | 30 | 30 | 30 | 30 | 30 | 30 | 30 | 30 | 30 |
| Organic solvent | | | | | | | | | | |
| B1 | 30 | 30 | 30 | 30 | | | | | | |
| B2 | | | | | 30 | 30 | 30 | | 30 | 25 |
| B3 | | | | | | | | 30 | | |

| | \multicolumn{10}{c}{Number of ink composition} |
|---|---|---|---|---|---|---|---|---|---|---|
| | 1 | 2 | 3 | 4 | 5 | 6 | 7 | 8 | 9 | 10 |
| Printing characteristics | | | | | | | | | | |
| Transferability of ink | B | A | A | B | B | A | A | A | B | A |
| Resistance to stain of non-printing portion | B | B | B | A | A | A | B | B | A | C |
| Resistance to retort treatment | | | | | | | | | | |
| Adhesive property | | | | | | | | | | |
| Before treatment | 100/100 | 100/100 | 100/100 | 100/100 | 100/100 | 100/100 | 100/100 | 100/100 | 100/100 | 100/100 |
| After treatment | 100/100 | 100/100 | 100/100 | 100/100 | 100/100 | 100/100 | 100/100 | 100/100 | 100/100 | 100/100 |
| Surface hardness | | | | | | | | | | |
| Before treatment | 4H | 4H | 4H | 4H | 4H | 4H | 4H | 3H | 3H | 4H |
| After treatment | 3H | 3H | 3H | 3H | 3H | 3H | 3H | H | H | 3H |

3. The ink composition of claim 1, wherein an acid value of said alkyd resin is not more than 30 mgKOH and a hydroxyl value thereof is from 120 to 200 mgKOH.

4. The ink composition of claim 2, wherein an acid value of said alkyd resin is not more than 30 mgKOH and a hydroxyl value thereof is from 120 to 200 mgKOH.

5. The ink composition of claim 1 which does not contain a curing agent.

6. The ink composition of claim 2 which does not contain a curing agent.

7. The ink composition of claim 3 which does not contain a curing agent.

8. The ink composition of claim 4 which does not contain a curing agent.

9. A printing method of a seamless can for retort food which comprises carrying out waterless lithographic printing of the ink composition of claim 1 on an outer surface of the seamless can for retort food, applying a finishing varnish and baking for curing.

10. A printing method of a seamless can for retort food which comprises carrying out waterless lithographic printing of the ink composition of claim 2 on an outer surface of the seamless can for retort food, applying a finishing varnish and baking for curing.

11. A printing method of a seamless can for retort food which comprises carrying out waterless lithographic printing of the ink composition of claim 3 on an outer surface of the seamless can for retort food, applying a finishing varnish and baking for curing.

12. A printing method of a seamless can for retort food which comprises carrying out waterless lithographic printing of the ink composition of claim 4 on an outer surface of the seamless can for retort food, applying a finishing varnish and baking for curing.

13. A printing method of a seamless can for retort food which comprises carrying out waterless lithographic printing of the ink composition of claim 5 on an outer surface of the seamless can for retort food, applying a finishing varnish and baking for curing.

14. A printing method of a seamless can for retort food which comprises carrying out waterless lithographic printing of the ink composition of claim 6 on an outer surface of the seamless can for retort food, applying a finishing varnish and baking for curing.

15. A printing method of a seamless can for retort food which comprises carrying out waterless lithographic printing of the ink composition of claim 7 on an outer surface of the seamless can for retort food, applying a finishing varnish and baking for curing.

16. A printing method of a seamless can for retort food which comprises carrying out waterless lithographic printing of the ink composition of claim 8 on an outer surface of the seamless can for retort food, applying a finishing varnish and baking for curing.

* * * * *